(12) United States Patent
Spreadbury

(10) Patent No.: US 7,737,886 B2
(45) Date of Patent: *Jun. 15, 2010

(54) DOPPLER RADAR SYSTEMS

(75) Inventor: David Spreadbury, Harston (GB)

(73) Assignee: Plextek Limited, Essex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/123,146

(22) Filed: May 19, 2008

(65) Prior Publication Data

US 2008/0284641 A1 Nov. 20, 2008

Related U.S. Application Data

(63) Continuation of application No. PCT/EP2006/068731, filed on Nov. 21, 2006.

(30) Foreign Application Priority Data

Nov. 21, 2005 (GB) .................... 0523676.5
Jan. 13, 2006 (GB) .................... 0600682.9

(51) Int. Cl.
*G01S 13/00* (2006.01)
(52) U.S. Cl. ...................................... 342/201
(58) Field of Classification Search ................ 342/201, 342/372, 81, 28, 100, 103, 114, 130, 157, 342/158, 160, 162, 189, 192, 196
See application file for complete search history.

(56) References Cited

U.S. PATENT DOCUMENTS

| | | | |
|---|---|---|---|
| 5,497,157 A * | 3/1996 | Gruener et al. ................ | 342/36 |
| 6,072,423 A | 6/2000 | Doisy et al. | |
| 7,567,202 B2 * | 7/2009 | Pearson et al. ................ | 342/81 |
| 2003/0128156 A1 | 7/2003 | Kishida | |

| | | | |
|---|---|---|---|
| 2004/0130482 A1 | 7/2004 | Lin et al. | |

(Continued)

FOREIGN PATENT DOCUMENTS

DE 4243669 6/1994

(Continued)

OTHER PUBLICATIONS

Chan et al., "A Beam Scanning Frequency Modulated Continuous Wave Radar," IEEE Trans. on Instrumentation and Measurement 47:1223-1227, 1998.

(Continued)

*Primary Examiner*—Dan Pihulic
(74) *Attorney, Agent, or Firm*—BainwoodHuang

(57) ABSTRACT

A frequency scanning radar system includes a frequency scanning radar controller for use in controlling a frequency generator, the frequency generator being arranged to generate a plurality of sets of signals, each set of signals having a different carrier frequency and comprising a sequence of modulation patterns, transmitted at a selected rate, wherein the radar controller is arranged to select the rate in dependence on the carrier frequency. The system also includes a signal processor arranged to derive tone data from received signals, wherein the signal processor is arranged to process the received signals at a rate dependent on the rate of transmission of the sequence of modulation patterns. Additionally, the system includes an audio system arranged to output audio data derived from signals received by the frequency scanning radar system by playback of the derived tone data at a constant rate.

34 Claims, 6 Drawing Sheets

U.S. PATENT DOCUMENTS

| | | | |
|---|---|---|---|
| 2004/0150552 A1 | 8/2004 | Barbella et al. | |
| 2005/0184903 A1 | 8/2005 | Isaji | |
| 2008/0284641 A1* | 11/2008 | Spreadbury | 342/201 |
| 2008/0284651 A1* | 11/2008 | Pearson et al. | 342/372 |

FOREIGN PATENT DOCUMENTS

| | | |
|---|---|---|
| DE | 10253808 | 7/2004 |
| EP | 0477155 | 3/1992 |
| GB | 2248359 | 4/1992 |
| JP | 55101878 | 8/1980 |
| WO | WO 2007057475 A2 * | 5/2007 |

OTHER PUBLICATIONS

ISR from PCT/EP2006-068731, mail date not provided.
UK Search Report from GB0600682.9, mail date not provided.

* cited by examiner

DOPPLER RADAR SYSTEMS

CROSS REFERENCE TO RELATED APPLICATIONS

This application claims the benefit of International Patent Application No. PCT/EP2006/068731 filed on Nov. 21, 2006 and entitled "IMPROVEMENTS TO DOPPLER RADAR SYSTEMS", the contents and teachings of which are hereby incorporated by reference in their entirety.

FIELD OF THE INVENTION

The present invention relates to improvements to Doppler radar systems, and is particularly, but not exclusively, suitable for use with frequency scanning radar systems.

BACKGROUND OF THE INVENTION

Radar systems are used to detect the presence of objects and to measure the location and movement of objects. It is common for such radar systems to sweep across a given region, scanning the region for the presence of such objects. In order to sweep over the region the radar systems either employ mechanical devices comprising an antenna that physically moves in space, or electronic devices comprising elements that are arranged to steer radiation as it is transmitted and/or received. One known group of such electronic devices is frequency scanning arrays, which, in response to input signals of varying frequencies, can steer a beam in an angular plane. Radar systems can also employ frequency scanning arrays for detection avoidance and/or in the presence of other radar systems and/or to counteract frequency jamming equipment (e.g. by hopping between operating frequencies in order to avoid detection of, interference with, or jamming of, the radar system).

Radar systems are commonly used to identify the Doppler frequency of targets so as to identify the magnitude and direction of movement thereof. In view of the fact that a target's Doppler frequency is dependent on the radar's carrier frequency, the use of frequency scanning antennas in a radar system presents problems in relation to the processing and interpretation of received signals.

SUMMARY OF THE INVENTION

A particular problem encountered when employing frequency scanning antennas is that the inherent and required variation in frequencies will modify the Doppler frequencies for a given target, thus modifying the inferred motion of the target and complicating any velocity ambiguity resolution for targets whose Doppler frequencies fall close to half of the sampling frequency (e.g. the pulse repetition frequency of the radar). The inventors realised that by varying the period of the frequency sweeps in proportion to the carrier frequency, the normalised Doppler frequency remains substantially constant.

Accordingly in relation to an aspect of the present invention, the inventors have developed a frequency scanning radar controller for use in controlling a frequency generator, the frequency generator being arranged to generate a plurality of sets of signals, each set of signals having a different characteristic frequency and comprising a plurality of signals transmitted at a selected rate, wherein the radar controller is arranged to select the rate in dependence on the characteristic frequency.

The invention can be embodied in a pulsed radar, for which each set of signals comprises a set of pulsed signals and each pulsed signal is repeated at a selected repetition rate. The radar controller is then arranged to modify the repetition rate in dependence on the characteristic frequency of the pulsed signal.

The invention can alternatively be embodied in a frequency modulated radar system, for which each set of signals comprises a sequence of modulation patterns. The radar controller is then arranged to modify a given modulation pattern in dependence on the characteristic frequency of the signal being modulated.

It is known to modify the modulation pattern of a continuous wave signal, but known methods either modify the signal randomly, as described in US2004/0130482, or on the basis of a sequence of values, as described in US2005/0184903. In either case the modulation patterns are modified either to overcome external interference, or/and interference between respective radar systems, or/and problems with over-range returns (these being signals received from targets that are located at a distance from the radar system such that their return signals are received after transmission of a next modulation pattern in the sequence). In each of these scenarios the motivation for modifying the modulation pattern is entirely unrelated to aspects of the transmitted signal.

In the continuous wave embodiments of the invention the radar controller is arranged to modify the duration of individual patterns in the sequence, thereby modifying the modulation pattern. In one arrangement each modulation pattern of the sequence comprises a linear ramp period and a dwell period, and the radar controller is arranged to modify the duration of dwell periods of respective modulation patterns in the sequence, thereby modifying the modulation pattern. In another arrangement each modulation pattern of the sequence comprises a linear ramp period and a descent period, and the radar controller is arranged to modify the duration of descent periods of respective modulation patterns in the sequence, thereby modifying the modulation pattern. In other arrangements the modulation pattern includes a combination of a ramp period, a descent period and a dwell period, in which case the duration of either of the descent or dwell periods can be modified.

The frequency scanning radar controller interoperates with a frequency generator that is arranged to output frequency modulated signals based on a range of characteristic frequencies. Conveniently the frequency generator is responsive to inputs from the controller—indicative of the respective durations—so as to modulate the characteristic frequency.

According to a further aspect of the present invention there is provided an audio system for outputting audio data derived from signals received by a frequency scanning radar system, the frequency scanning radar system comprising a signal processor arranged to derive tone data from said received signals and a frequency scanning radar controller according to any one of the preceding claims, wherein the audio system is arranged to playback the derived tone data at a constant rate.

Preferably the constant rate is selectable in dependence on said duration of individual modulation patterns of the sequence and each cycle of audio data comprises data derived from one or more said modulation patterns in the sequence. The data derived from one said modulation pattern in the sequence is played back at least once in each cycle of audio data, and, in the case where the audio rate is greater than that corresponding to the duration of individual modulation patterns, the data derived from one said modulation pattern in the sequence is played back more than once in each cycle of audio data.

Conveniently the audio system is configured so as to control transitions between consecutive cycles of audio data— e.g. by means of an audio fading function that can be applied to the audio data appearing at respective ends of a given cycle of audio data.

Further features and advantages of the invention will become apparent from the following description of preferred embodiments of the invention, given by way of example only, which is made with reference to the accompanying drawings.

Figure 1:
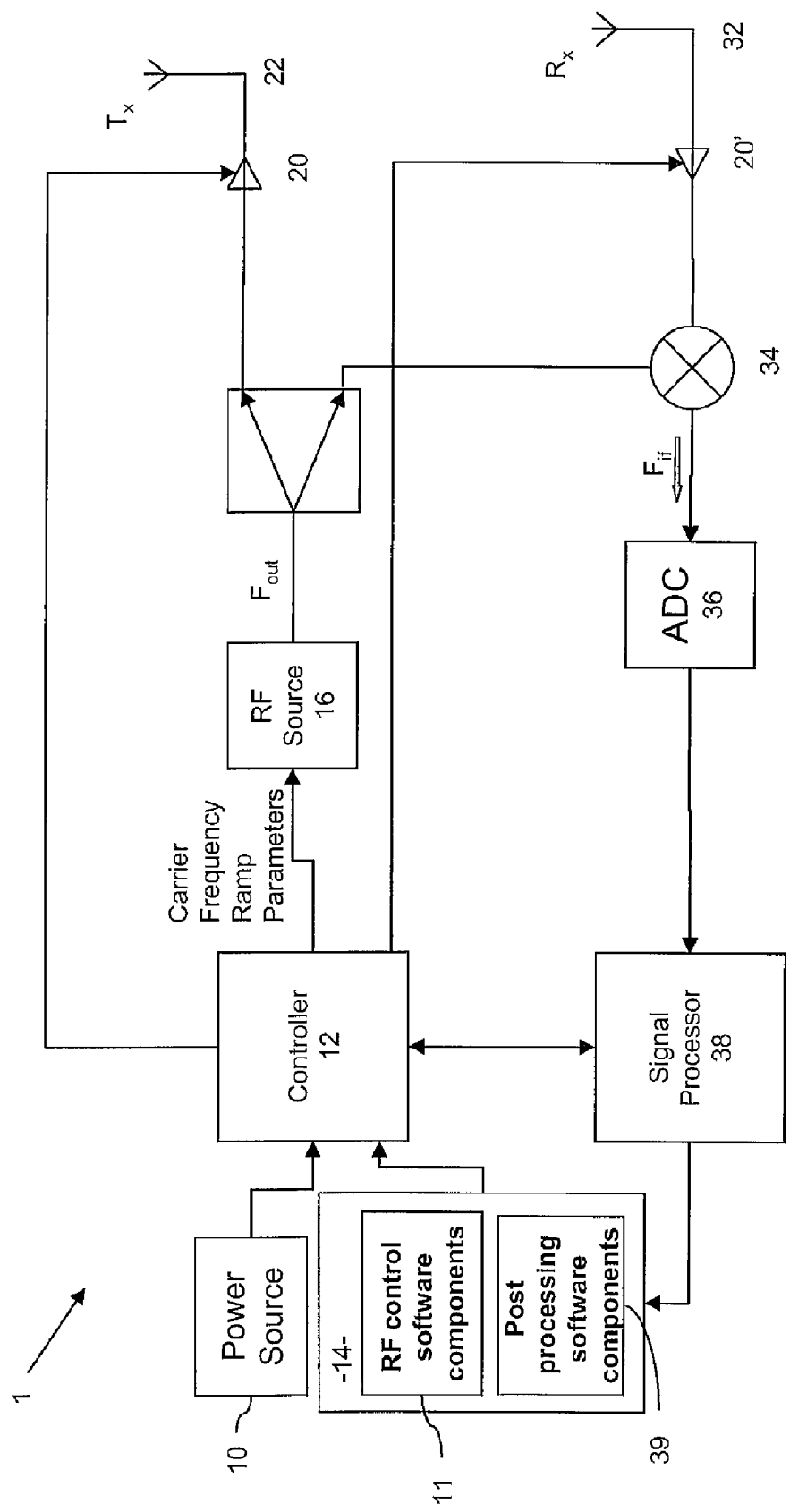
FIG. 1 is a schematic block diagram showing components of a radar system according to embodiments of the invention.

Several parts and components of the invention appear in more than one Figure; for the sake of clarity the same reference numeral will be used to refer to the same part and component in all of the Figures. In addition, certain parts are referenced by means of a number and one or more suffixes, indicating that the part comprises a sequence of elements (each suffix indicating an individual element in the sequence). For clarity, when there is a reference to the sequence per se the suffix is omitted, but when there is a reference to individual elements within the sequence the suffix is included.

DETAILED DESCRIPTION OF THE INVENTION

FIG. 1 shows a radar system 1 with which embodiments of the invention operate, the radar system 1 comprising a power source 10, a controller 12, and a computer 14, the power source and computer 10, 14 being arranged to provide power to, and operational control over, the controller 12. The controller 12 comprises a microprocessor and a set of instructions (not shown) for execution thereby, effectively generating control signals that cause the RF frequency source, or signal generator 16, to output RF energy at a specified frequency $F_{OUT}$, and this output signal, under control of amplifiers 20, drives antenna 22. As will be described in more detail below, the RF frequency source 16 generates signals within a range of frequencies, causing the antenna 22 to transmit beams in different angular directions, thereby scanning over a region beyond the radar system 1.

The radar system 1 also includes a receiving antenna 32, which receives radiated signals reflected back from objects, and passes the received radiation through amplifier components 20' to mixer 34. The mixer 34 comprises two inputs: a first connected to the RF source 16; and a second connected to the receiving antenna 32. The output of the mixer 34 is fed to an Analogue to Digital converter ADC 36, to produce a digitised signal for input to the signal processor 38, which performs analysis of the received signal. The signal processor 38 performs a spectral analysis on the received signals, because the range between the radar system and external (reflecting) objects is contained as frequency information in the signal. Aspects of the receiving and processing components are described in detail below, but first aspects of the RF frequency source and antenna will be described.

Figure 2:
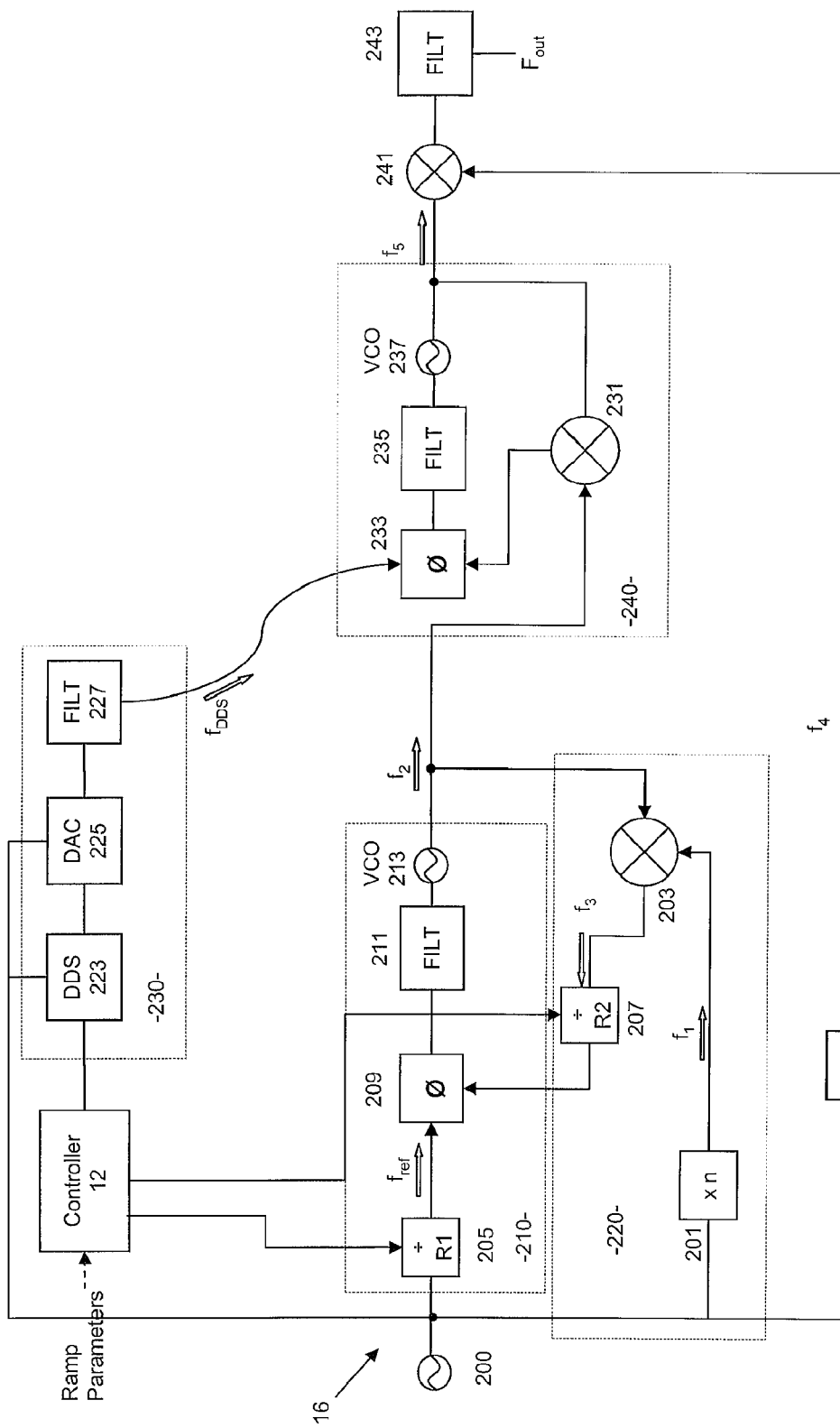
FIG. 2 is a schematic block diagram showing an arrangement of components of a frequency generator shown in FIG. 1.

FIG. 2 shows components of a RF frequency generator that can be employed to generate signals having a range of frequencies. Referring to FIG. 2, the frequency generator 16 comprises a frequency source 200, first circuit portion 210 and a second circuit portion 220. The first circuit portion 210 comprises a frequency divider 205, a phase comparator 209, a filter 211, and a Voltage Controlled Oscillator VCO 213, while the second circuit portion 220 comprises a frequency divider 207, static multiplier 201 and a mixer 203. The mixer 203 receives, as input, signals output from the VCO 213 and signals from the high grade, static multiplier 201, and generates signals of frequency equal to the difference between the frequencies of the two inputs ($f_3$). The values R1, R2 characterising the frequency dividers 205, 207 are selectable, and the phase comparator 209 is arranged to compare the frequency and phase of signals output from the frequency dividers 205, 207 ($f_3$/R2 and $f_{ref}$), so as to output a phase-error signal, of magnitude dependent on the difference between $f_3$/R2 and $f_{ref}$. The phase-error signal is input to the VCO 213, and the first circuit portion 210 operates so as to cause the output from the VCO 213 to stabilise in dependence on the phase-error signal. Thus different values of R2 can be used to force the loop to stabilise at a frequency multiple of the input signal. In one arrangement the frequency source 200 is embodied as a crystal oscillator and in another arrangement as a SAW oscillator.

Figure 3:
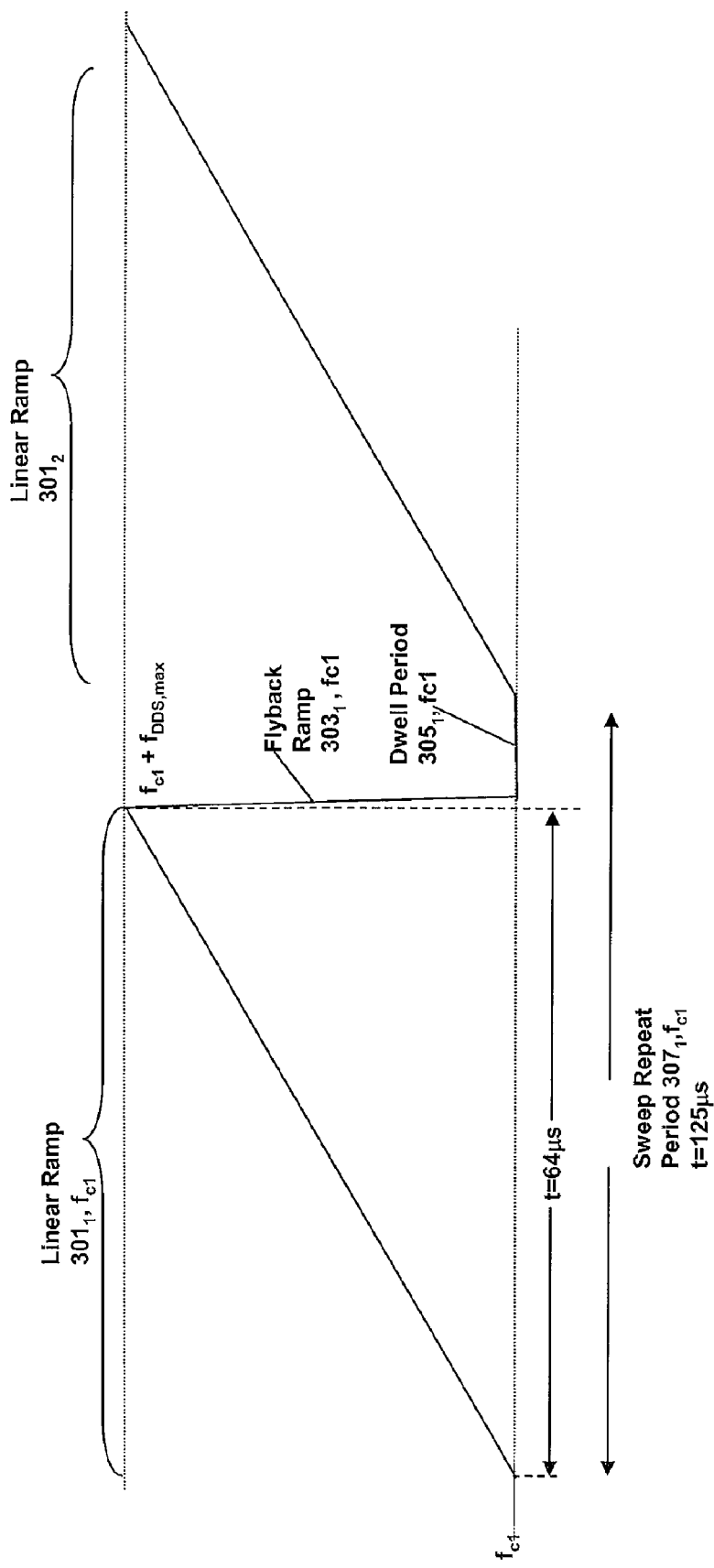
FIG. 3 is a schematic diagram showing a modulation pattern for use by the frequency generator of FIG. 2.

The signals output from the second circuit portion are then modulated by output $f_{DDS}$ of a third circuit portion 230, which in one arrangement comprises a Direct Digital Synthesiser 223, a Digital to Analogue Converter DAC 225 and a low pass filter 227. The third circuit portion 230 is configured, under control of the controller 12 shown in FIG. 1, to generate a repeating pattern comprising a linear frequency ramp. The ramp has a specified duration and magnitude, values of which are programmed via the controller 12. FIG. 3 shows an example of one such frequency ramp $301_1$ for a given carrier frequency $f_{c1}$, the duration of which is approximately 64 µs, the magnitude of which, in terms of range of frequencies ($f_{DDS,max}$-$f_{DDS,min}$), is approximately 20 MHz, and is followed by a flyback ramp $303_1$ to prepare the third circuit portion 230 for the next ramp $301_2$. The pattern repeats at a predetermined rate—in the present example a rate of 8 KHz (thus a sweep repeat period 307 of 125 µs (subject to the modifications described later in the specification)) is a convenient choice. Such a modulation pattern is entirely conventional and the foregoing details are included as illustrative; the skilled person will appreciate that any suitable values could be selected, dependent upon the use of the radar system (e.g. the nature of the targets to be detected). For each carrier frequency, the third circuit portion 230 is arranged to repeat the linear ramp pattern a specified number of times, e.g. 256 or 512 times, the number being dependent on the desired signal to noise ratio and therefore a design choice. Whilst the third circuit portion 230 shown in FIG. 2 comprises digital synthesiser components, it could alternatively be embodied using analogue components such as a sawtooth generator and VCO or similar. Preferably, and in order to save power, it is to be noted that the antenna 22 is not energised during either of the flyback ramp or dwell periods 303, 305.

Turning back to FIG. 2, the output $f_{DDS}$ of the third circuit portion 230 is input to a fourth circuit portion 240, which comprises a phase comparator 233, a filter 235, a Voltage Controlled Oscillator 237 and a mixer 231. The mixer receives signals output from the second circuit (having frequency $f_2$) and signals output from the VCO 237 (having frequency $f_5$) and outputs a signal at a frequency equal to the difference in frequency between $f_2$ and $f_5$. The phase comparator 233 outputs a phase-error signal, of magnitude dependent on the difference between ($f_2$-$f_5$) and $f_{DDS}$ to the VCO 237, and the fourth circuit portion 240 operates so as to cause the output from the VCO 237 to stabilise accordingly.

The signals output from the fourth circuit portion 240 (having frequency $f_5$) are then combined, by means of mixer 241, with signals of a reference frequency $f_4$, which are signals output from the oscillator 200 having been multiplied by a second static multiplier 251, and the output is filtered (filter 243) so as to generate a signal having an output frequency $F_{OUT}$. It will be appreciated from FIG. 2 that when the signal generator 16 is operable to output signals corresponding to a carrier frequency of between 15.5 GHz and 17.5 GHz, for a crystal oscillator 200 outputting signals of frequency 100 MHz, the second static multiplier 251 is of the order 130. Thus for each carrier frequency the frequency generator 16 generates a repeating pattern of frequency modulated signals of various carrier frequencies.

Whilst the signal generator 16 could be used to generate frequencies within any selected range of frequencies, when used as a ground-based radar system, the frequency range can fall within the X band (8 GHz-12.4 GHz); the Ku band (12.4 GHz-18 GHz); the K band (18 GHz-26.5 GHz); or the Ka band (26.5 GHz-40 GHz), and most preferably within the Ku band, or a portion within one of the afore-mentioned bands.

Figure 4:
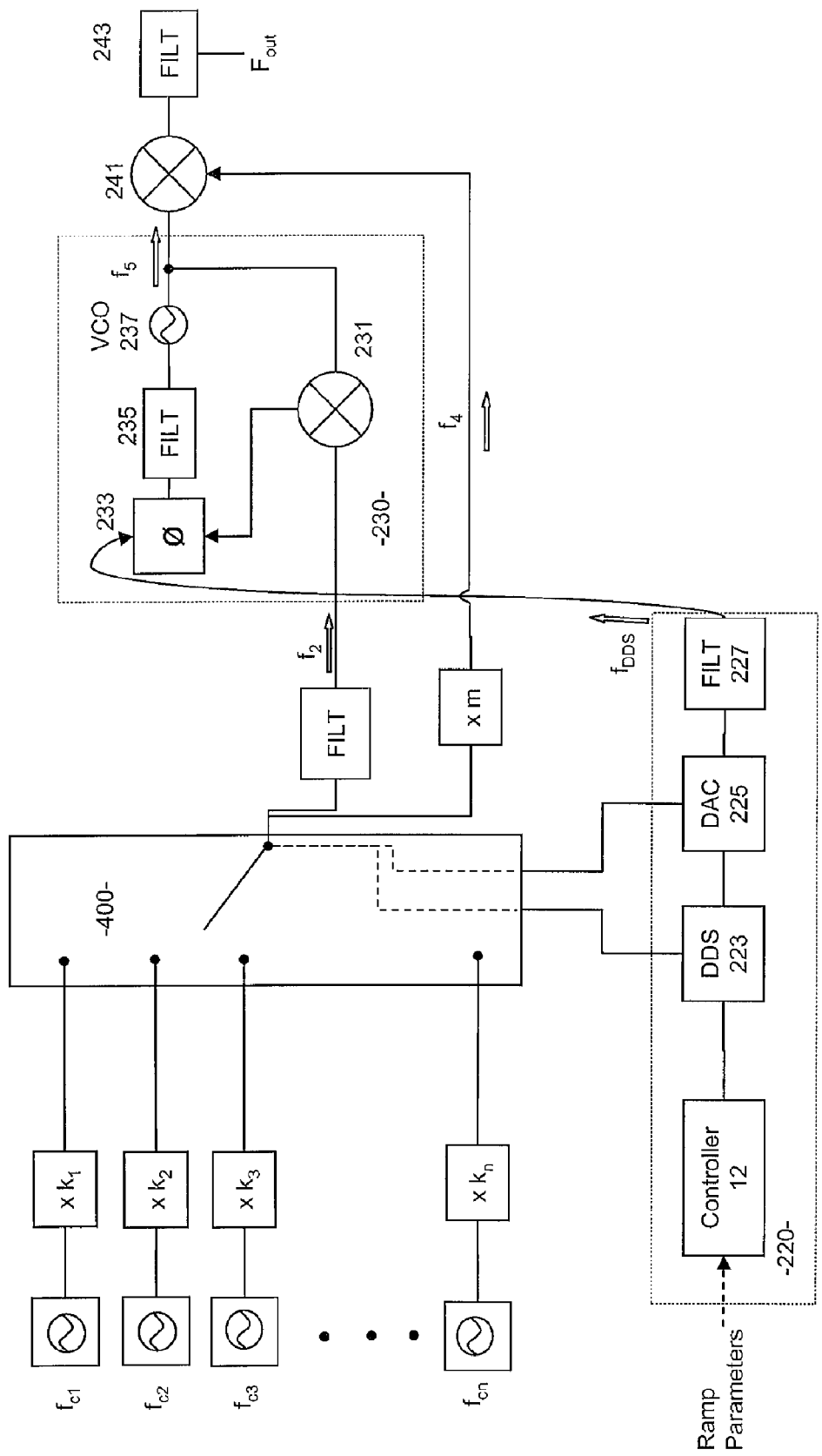
FIG. 4 is a schematic block diagram showing an alternative arrangement of components of a frequency generator shown in FIG. 1.

Whilst in preferred arrangements the first and second circuit portions 210, 220 of frequency generator 16 are embodied as shown in FIG. 2, the frequency generator 16 could alternatively be based on an arrangement comprising a plurality of fixed frequency oscillators, as shown in FIG. 4, one of which is selected via switch 400 so as to generate a signal at frequency $f_2$. Judicial selection of an appropriate fixed frequency oscillator (e.g. a crystal oscillator) means that the frequency generator 16 can incur minimal phase noise, since the signals are taken directly from one of the oscillators. However, this advantage is accompanied by a corresponding limitation, namely that there is no means for fine-tune adjustment of the carrier frequency, which can be a disadvantage when working with antennas 22 that require fine tuning of the carrier frequency to achieve optimal beamwidth distribution (in terms of distribution of radiation within the lobes).

It will be appreciated from the foregoing that the frequency $f_{OUT}$ of signals output from the signal generator 16 is controlled by the controller 12. In addition to controlling the duration and rate of the ramp as described above, the controller 12 is arranged to select a different value for carrier frequency after the ramp pattern has been repeated a specified number of times for a given carrier frequency (examples of 256 and 512 were given above). In one arrangement the values for the carrier frequency can be selected from a look-up table accessible to the controller 12 (e.g. stored in local memory or on the computer 14), this look-up table being particular to a given antenna 22, 32.

Figure 5:
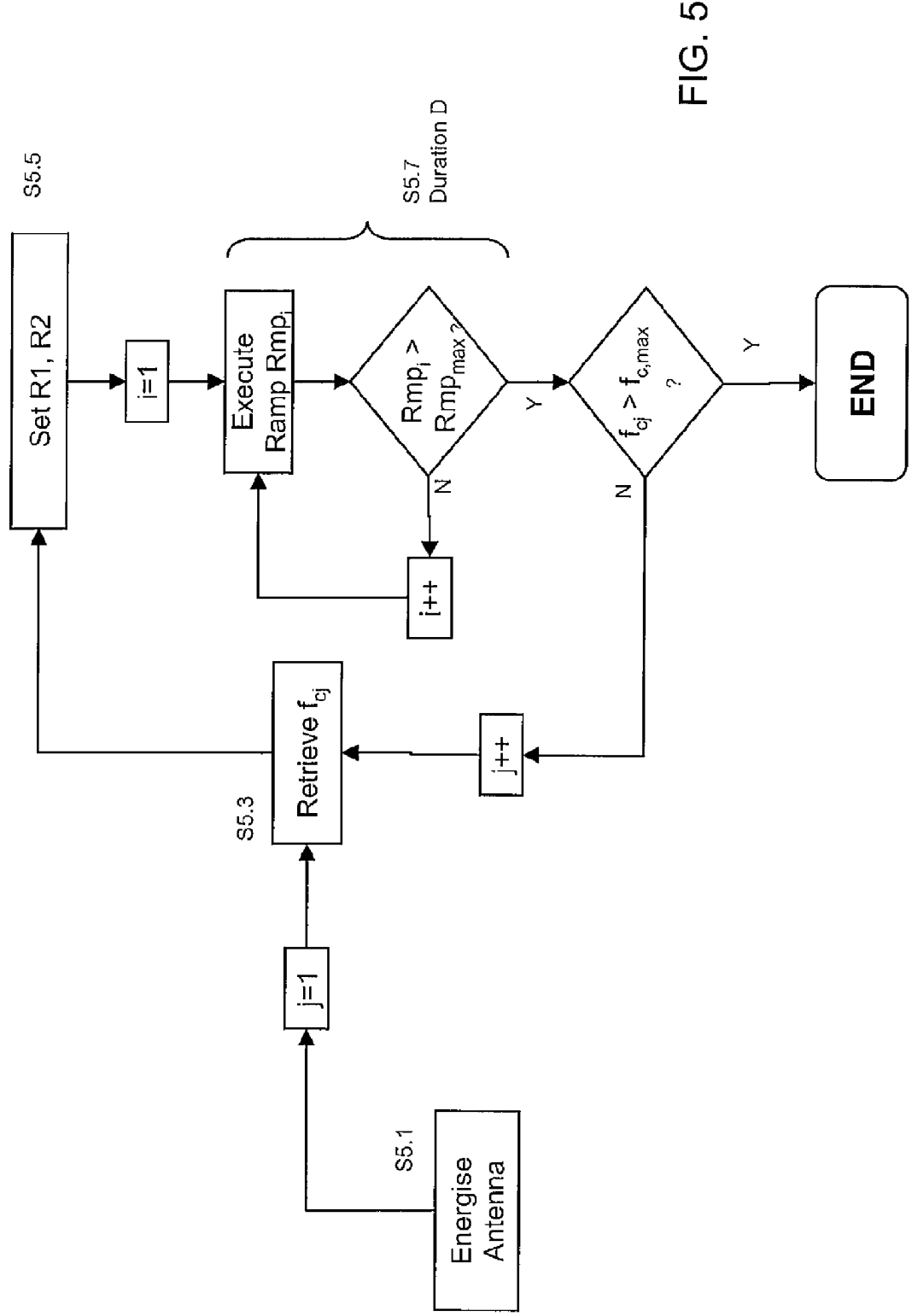
FIG. 5 is a schematic flow diagram showing steps performed by the controller shown in FIG. 1 during scanning of the radar system of FIG. 1.

Operation of the radar system 1 described above will now be described with reference to FIG. 5, which is a schematic flow diagram showing steps carried out by the controller 12. At step S5.1 the controller 12 energises the antenna 22; at S5.3 the controller 12 retrieves the value of the first carrier frequency $f_{c1}$ (e.g. from the look-up table mentioned above), and at step S5.5 the controller 12 sets the values of R1 and R2 accordingly (to set the carrier frequency). Subsequently the third circuit portion 230 is triggered to generate the ramp pattern a predetermined number of times $Rmp_{max}$ (S5.7), so as to repeatedly modulate the carrier frequency. Having reached $Rmp_{max}$, the controller retrieves the value of the next carrier frequency $f_{c2}$ and sets the values R1, R2. Preferably the overall duration of step S5.7—in other words the duration of any given set of repetitions of the linear ramp $301_i$ pattern—is the same for all values of the carrier frequency, $f_{cj}$.

The description has thus far focussed on the generation and transmission of signals from the radar system 1; referring to FIG. 1, aspects of receiving and processing of signals will now be described. As described above the radar system 1 preferably also includes a separate antenna 32 for receiving radiation. The signals received by the receiving antenna 32 are input to mixer 34, together with the output $F_{OUT}$ from the RF frequency generator 16, and, in accordance with standard homodyne operation, the output from the mixer 34 is fed through an ADC 36 to produce a digitised Intermediate Frequency ($F_{if}$) signal as input to the signal processor 38. Energising of the receiving antenna 32 is performed under control of the controller 12, and, as for the transmitting antenna 22, this occurs during the linear ramp period only $301_i$.

The signal processor 38 is conveniently embodied as a programmable logic controller (PLC) and a plurality of software components, which run locally on the PLC 38 in response to signals received from a conventional PC computer 14 and which are written using the proprietary programming language associated with the PLC 38.

Figure 6:
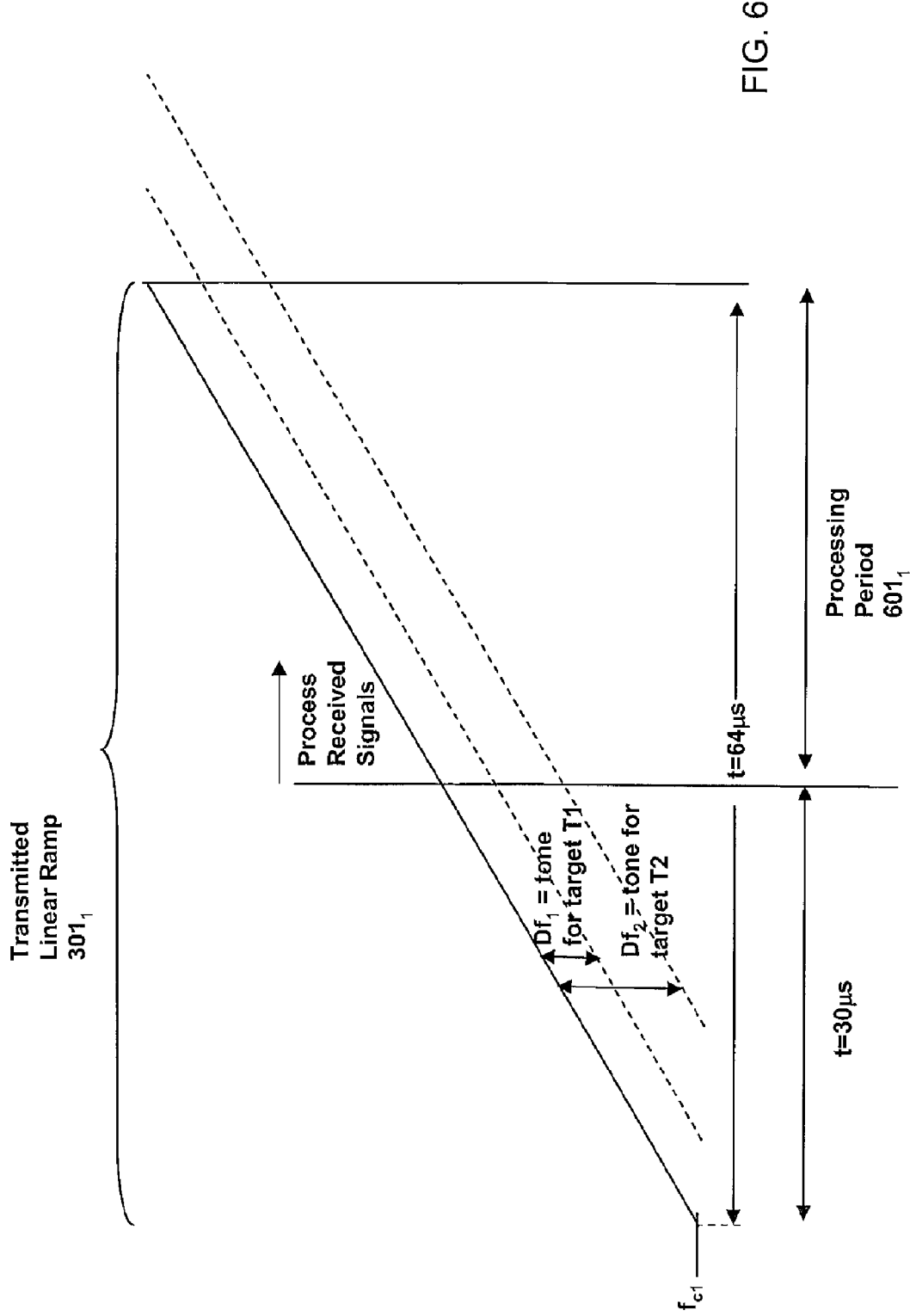
FIG. 6 is a schematic diagram showing processing of signals in relation to a transmitted modulation pattern.

As described above, the radar system 1 operates according to homodyne principles, which means that the Intermediate Frequency $F_{if}$ is equal to differences between the received signal frequency and the transmitted signal frequency. In embodiments of the invention, as will be appreciated from the foregoing and FIGS. 2 and 3 in particular, the output of the radar system 1 is a sequence of frequency sweeps $301_i$. It is a well known principle of radar that targets located in the path of a given transmitted beam will reflect the transmitted signals; since the transmitted signal in embodiments of the present invention comprises a linear frequency sweep $301_i$, the reflected signals also comprise a linear frequency sweep. Targets that are stationary will generate reflected signals that are identical to the transmitted signals (albeit somewhat attenuated), but separated therefrom at a constant frequency difference referred to herein as a tone. Referring to FIG. 6, it will be appreciated from the Figure that different targets T1, T2—located at different distances from the radar system 1—reflect the transmitted sweep $301_i$ at different delays in relation to the time of transmission, and that therefore targets T1, T2 at these different locations will be associated with different tones $\Delta f_1$, $\Delta f_2$.

In view of the fact that the signals output from the mixer 34 contain tones, the signal processor 38 is arranged to delay the processing of signals until the ramp 301 has traveled to the extents of the detection region and back. Thus for example, if the detection region extended to 4.5 km from the radar system 1, the signal processor 38 would start processing signals output from the mixer 34 at:

$$\frac{4500 \times 2}{3 \times 10^8} = 30 \text{ μs from the start of transmission of a given ramp } 301_i.$$

Considering, for the sake of clarity, one processing period $601_1$, the signal processor 38 essentially calculates the Doppler frequency of targets within range of the transmitted beam—and which reflect the transmitted beam. This is achieved by sampling the received tones $\Delta f_1, \Delta f_2 \ldots \Delta f_m$ at a predetermined sampling rate. The sampling rate is selected so as to as ensure that phase shifts of the transmitted signal, which are induced by moving targets, can be captured. The skilled person will appreciate that this is dependent on the ramp rate, since the Doppler frequency is dependent on the frequency of the transmitted signal:

$$\text{Doppler Frequency} = 2vf_c/c \qquad \text{[Equation 1]}$$

Thus, the output of the ADC 36 falling within the processing period 601$_1$ will be processed a predetermined number of times (corresponding to the sampling rate) by the signal processor 38. Each sample will contain zero, one or a plurality of tones, each relating to signals reflected from targets.

As will be appreciated from the foregoing, the linear ramp 301$_i$ is transmitted a plurality of times for each carrier frequency. Accordingly the signal processor 38 processes data received during a corresponding plurality of processing periods 601$_i$, and generates, by means of a Range FFT, a set of return samples, individual members of which are assigned to a respective set of range gates for each said processing period 601$_1$. Thus the output of the Range FFT, for a given processing period 601$_1$, is frequency information distributed over so-called range gates. As is well known in the art, range gates represent successive distances from the radar system 1, such that if return samples fall within a given range gate, this indicates the presence of a target located at a distance equal to the range gate within which the return sample falls.

Having transformed the received signals into range gates the signal processor 38 is arranged to take the FFT of the return samples assigned to each given range gate. In the current example it will be appreciated that each set of range gates corresponds to transmission of a linear ramp 301$_i$ (for a given carrier frequency), and that the sampling rate in relation to range gates—the rate at which data falling within a given range gate are measured—is the frequency at which the pattern of transmission of linear ramps 301$_i$ is repeated (commonly referred to as the Pulse Repetition Frequency (PRF)). In the example given above, and with reference to FIG. 3, this is nominally 8 KHz. Accordingly, for each carrier frequency, the signal processor 38 effectively generates an array of data, each row in the array corresponding to a given processing period 601$_i$, and each column in the array corresponding to a given range gate.

The FFT output comprises amplitudes and phases of various components of signal energy which fall on frequencies spaced linearly at the inverse of the duration of a complete signal sample set (in embodiments of the invention, the signal set comprises tones, not absolute frequency values). In the current example, therefore, and assuming the signal sample set for a given carrier frequency to comprise the 512 linear ramps 301$_1$ ... 301$_{512}$ transmitted at a rate of 8 KHz, there are 512 FFT output bins spaced at a Doppler frequency of 8000/512=15.625 Hz; for a carrier frequency of 15 GHz, this is equivalent to 0.15625 m/s. Thus each FFT output bin represents a different velocity; stationary targets will appear in bin 0, while moving targets will appear in a bin dependent on their velocity (a target travelling at 10 m/s will appear in bin 64).

As is known in the art, the signal processor 38 can be arranged to store each set of range gate samples in a "row" of a conceptually rectangularly-organised memory, referred to as a corner store, each row corresponding to range gates falling within a given processing periods 601$_i$ and thus to a particular linear ramp 301$_i$. Once all 512 linear ramps 301$_1$ ... 301$_{512}$ have been transmitted, each column—i.e. each range gate—is read out and input to a FFT for processing thereby in the manner described above.

From Equation 1, it will be appreciated that the Doppler frequency is directly proportional to the carrier frequency $f_c$. Therefore when the carrier frequency varies—as is the case with frequency scanning antennas—the variation in carrier frequency will modify the derived Doppler frequencies so as to effectively scale the magnitude of the frequencies. For example, a radar system that operates between 15.5 GHz to 17.5 GHz can generate Doppler frequencies, for a given target, which vary by ±6%. This equates to a system-generated shift in Doppler frequency of more than 2 semitones, and a variation in ambiguous Doppler velocity from 70 mph to 79 mph, which can complicate the task of removing velocity ambiguity from targets moving at these speeds and above.

Accordingly the controller 12 is arranged to modify the sweep repeat period 307 (referred to as Pulse Repetition Frequency (PRF) or sweep repetition frequency) such that the sweep repetition frequency is proportional to the carrier frequency, thereby effectively removing this systematic aberration. Turning back to FIG. 5, this means that step S5.5 performed by the controller 12 in relation to carrier frequency $f_{cj}$ retrieved at step S5.3 is accompanied by calculation of a sweep period 307 for the particular value of this carrier frequency $f_{cj}$. In preferred embodiments of the invention the linear sweep period 301 remains unchanged (so that the effect of this adjustment does not affect the processing performed by the signal processor 38), and the controller 12 adjusts the duration of the flyback and/or dwell periods 303, 305; most preferably the dwell period 305 is modified. Of course all of the repetitions of the sweep repeat period 307$_1,f_{cj}$ ... 307$_{512}$, $f_{cj}$ are identical for a given carrier frequency $f_{cj}$ (step S5.7). In one embodiment the controller 12 has access to a look-up table, which lists sweep repeat periods 307$_j$ for discrete carrier frequencies $f_{cj}$. Conveniently such data could be stored in the look-up table that is accessed by the controller at step S5.3, when identifying a next carrier frequency $f_{cj}$.

As described above in relation to FIG. 5, the overall duration D of step S5.7 is preferably maintained constant. When, as is the case with embodiments of the invention, the sweep repeat period 307$_j$ varies in accordance with carrier frequency $f_{cj}$, the duration of 512 repetitions applied in respect of each different carrier frequency varies; thus, of itself, the period associated with 512 repetitions would not be of duration D for all carrier frequencies. In order to ensure that the duration is nevertheless constant, the controller 12 is configured to wait for a period equal to the time difference between the end of 512 repetitions and duration D before moving onto the next instance of steps S5.3, S5.5 and S5.7 (i.e. for a different carrier frequency). In the present example the value of D is preferably set to the sum of 512 sweep repeat periods 307 corresponding to the duration of the longest sweep repeat period (and thus that associated with the lowest carrier frequency $f_{cj}$).

This feature of the controller 12 is advantageous for configurations in which the linear ramp period 301 is constant (in FIG. 3 it is shown as 64 µs), incurring a fixed transmitter power dissipation: maintaining duration D for the overall duration of step S5.7 means that the average transmitter dissipation is constant and independent of variations to the sweep repeat period 307 (PRF). As a result the temperature of the transmitter $T_x$ is maintained at a constant level, which, in turn, minimises the variations in parameters that are temperature dependent.

Preferably the Doppler frequencies are scaled and output as tones within the audible range and at a fixed audio sample rate. Playing back the tones at a fixed rate is a convenient approach in view of the fact that the Doppler frequencies have been normalised in relation to the variation in carrier frequency.

As an alternative to selecting sweep repeat periods $307_j$ as a function of carrier frequency $f_{cj}$, the sweep repeat period $307_j$ could be varied incrementally, for example linearly, based on the approximation $1+\alpha \approx 1/(1-\alpha)$ for $\alpha \ll 1$. For the example frequency range of 15.5 GHz-17.5 GHz, the sweep repeat period 307 for a carrier frequency of 15.5 GHz could be 140.65 μs, and period 307 for a carrier frequency of 17.5 GHz could be 125 μs, while the sweep repeat period 307 for carrier frequencies between the extents of this range can be selected so as to vary linearly between 125 μs and 140.65 μs. As for the first alternative—where the sweep repeat period 307 is varied discretely as the carrier frequency varies—the linear ramp 301 and thus the processing periods 601 remain unchanged for all values of the sweep repeat period 307. The net change in Doppler frequency is then reduced to ±0.2% and the ambiguous Doppler velocity varies from 78.7 mph to 79.0 mph. As for arrangements for which the sweep repeat period 307 (PRF) is selected in direct dependence on the carrier frequency, the duration of any given set of repetitions of sweep repeat period can be fixed at duration D.

As described above, a radar system according to embodiments of the invention can conveniently be used for transceiving radio frequency energy and processing the same so as to output an audible representation of Doppler frequencies and thus identifying moving targets. The signal processor 38 is arranged to transmit data indicative of the Doppler frequencies to the computer 14, which comprises a suite of software components 39 arranged to convert the Doppler frequencies to audible signals and to playback the same. As described above, the Doppler Frequencies are normalised by processing the received signals at a variable rate, the rate being selected in dependence on the carrier frequency of the transceived signal, while the rate at which the audio is played back is substantially constant. Preferably the post processing software components 39 are arranged to ensure smooth transition between respective audio bursts by controlling the playback rate in relation to the rate at which, for a given range gate, data have been processed by the signal processor 38 (i.e. the frequency at which the pattern of transmission of linear ramps $301_i$ is repeated).

If the PRF is varied between 7 KHz and 8 KHz and the audio playback rate is 8.5 KHz, then in the absence of suitable phased-audio control, there will be gaps in the audio output, which presents an interruption to any audible analysis of the Doppler data; one way of mitigating this is to recycle Doppler data during periods that would otherwise be silent, until such time as further Doppler data are made available from the signal processor 38. In order to ensure a smooth transition between respective sets of Doppler data, the computer 14 would be arranged to fade-out previous, and fade-in current, sets of Doppler data. As an alternative, the audio playback rate could be set at a value lower than the PRF (e.g. for the current example, 6.9 KHz) so that respective sets of Doppler data overlap; the periods of overlap can be managed using appropriately selected fade-in and fade-out functions. As a further alternative, previous sets of Doppler data could be played back by the computer 14 during what would otherwise be gaps in the audio output. This alternative is particularly appropriate for arrangements in which the radar is transmitting in a fixed direction and is therefore operating at a constant carrier frequency, meaning that the audio bursts are coherently related to one another.

In arrangements where the duration of sets of repetitions of the linear ramp period $301_i$ is constant (duration D), any set of Doppler data (corresponding to a given carrier frequency $f_{cj}$) will arrive at the signal processor 38 a constant rate, which means that the software components 39 can be configured to apply the same conditions in relation to overlaps and/or gaps in the Doppler data (since the amount of overlap or gap can always be calculated from duration D). An advantage of this arrangement is that it simplifies the logic associated with the post-processing software components 39 and enables more constant audio output over the varying PRF.

A particular feature of a radar system according to embodiments of the invention is that the software components 39 are arranged to transmit data output from the signal processor 38 to a remote processing system, for tracking and monitoring of targets. Most preferably the software components 39 are arranged to transmit data output from the signal processor 38 each time the carrier frequency—and thus region being scanned—changes. This means that the computer 14 acts primarily as a conduit for data, while the data intensive processes of correlating targets between successive scans, rendering of targets upon a display and prediction of target behaviour can be performed by a separate processing system. In a preferred arrangement the data are transmitted wirelessly, but it will be appreciated that any suitable transmission means could be used.

Additional Details and Alternatives

Whilst in the foregoing the linear ramp 301 is independent of variations in the sweep repeat period, the controller 12 could alternatively modify the duration and/or slope of the linear ramp. Whilst this is not a preferred method, because operation of the signal processor 38 (in particular in relation to the processing periods 601) would have to be modified, modifying the slope is a convenient method when more than one radar system is being utilised in a given region, since the difference in slopes of the linear ramp can be used to distinguish between output from respective radar systems.

In relation to the form of the frequency scanning antenna, the antenna 22, 32 can be embodied as a travelling wave antenna or as a waveguide in the form of a serpentine antenna or similar. Suitable antennas are described in US patents U.S. Pat. No. 4,868,574 and applicant's co-pending application entitled "Frequency scanning antenna".

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A frequency scanning radar system comprising:
a frequency scanning radar controller for use in controlling a frequency generator, the frequency generator being arranged to generate a plurality of sets of signals, each set of signals having a different carrier frequency and comprising a sequence of modulation patterns, transmitted at a selected rate, wherein the radar controller is arranged to select the rate in dependence on the carrier frequency;
a signal processor arranged to derive tone data from received signals, wherein the signal processor is arranged to process the received signals at a rate dependent on the rate of transmission of the sequence of modulation patterns; and an audio system arranged to output audio data derived from signals received by the frequency scanning radar system by playback of the derived tone data at a constant rate.

2. A frequency scanning radar system according to claim 1, wherein the radar controller is arranged to modify a given modulation pattern in dependence on the carrier frequency of the signal being modulated.

3. A frequency scanning radar system according to claim 2, wherein the radar controller is arranged to modify the duration of individual modulation patterns of the sequence, thereby modifying the modulation pattern.

4. A frequency scanning radar system according to claim 2, wherein each modulation pattern of the sequence comprises a ramp period and an intervening period, and the radar controller is arranged to modify the duration of the intervening periods of respective modulation patterns in the sequence, thereby modifying the modulation pattern.

5. A frequency scanning radar system according to claim 4, wherein each modulation pattern of the sequence comprises a linear ramp period and a dwell period, and the radar controller is arranged to modify the duration of dwell periods of respective modulation patterns in the sequence, thereby modifying the modulation pattern.

6. A frequency scanning radar system according to claim 4, wherein each modulation pattern of the sequence comprises a linear ramp period and a descent period, and the radar controller is arranged to modify the duration of descent periods of respective modulation patterns in the sequence, thereby modifying the modulation pattern.

7. A frequency scanning radar system according to claim 2, wherein each modulation pattern of the sequence comprises a linear ramp period.

8. A frequency scanning radar system according to claim 3, wherein the constant rate is selectable in dependence on said duration of individual modulation patterns of the sequence.

9. A frequency scanning radar system according to claim 1, wherein each cycle of audio data comprises data derived from one or more said modulation patterns in the sequence.

10. A frequency scanning radar system according to claim 9, wherein the data derived from one said modulation pattern in the sequence is played back at least once in each cycle of audio data.

11. A frequency scanning radar system according to claim 6, wherein at least some data derived from one said modulation pattern in the sequence is played back more than once in each cycle of audio data.

12. A frequency scanning radar system according to claim 1, wherein the audio system is arranged to control transitions between consecutive cycles of audio data.

13. A frequency scanning radar system according to claim 12, wherein the audio system is arranged to apply an audio fading function to tone data played back at respective ends of a given cycle of audio data.

14. A frequency scanning radar system according to claim 12, wherein the audio system is arranged to select tone data from a previous cycle of audio data for use in playback prior to receipt of a next cycle of audio data.

15. A frequency scanning radar system according to claim 14, wherein the tone data is selected from an end of the previous cycle of audio data.

16. A frequency scanning radar system according to claim 1, wherein the constant rate is selected so as to be greater than a rate corresponding to said duration of individual modulation patterns of the sequence.

17. A scanning radar system comprising a frequency generator, a frequency scanning antenna, a receiver, and an audio system, wherein the frequency generator is arranged to generate a plurality of sets of signals, each set of signals having a different carrier frequency and comprising a plurality of swept signals transmitted at a selected rate, wherein the frequency scanning antenna is arranged to cooperate with the frequency generator so as to transceive radiation over a region having an angular extent dependent on the said carrier frequencies, wherein the receiver is arranged to derive tone data from signals received from a target and to process the received signals in dependence on the selected rate so as to alleviate variations in Doppler frequency arising from transceiving of the radiation over the angular extent, and wherein the audio system is arranged to output audio data derived from signals received by the scanning radar system by playback of the derived tone data at a constant rate.

18. An audio system for outputting audio data derived from a frequency scanning radar system, the frequency scanning radar system comprising:

a frequency scanning radar controller for use in controlling a frequency generator, the frequency generator being arranged to generate a plurality of sets of signals, each set of signals having a different carrier frequency and comprising a sequence of modulation patterns, transmitted at a selected rate, wherein the radar controller is arranged to select the rate in dependence on the carrier frequency; and a signal processor arranged to derive tone data from signals received by the frequency scanning radar system, the signal processor being arranged to process the received signals at a rate dependent on the rate of transmission of the sequence of modulation patterns, wherein the audio system is arranged to output audio data derived from signals received by the frequency scanning radar system by playback of the derived tone data at a constant rate.

19. An audio system according to claim 18:

wherein the radar controller is arranged to modify the duration of individual modulation patterns of the sequence, thereby modifying the modulation pattern, and wherein the constant rate is selectable in dependence on said duration of individual modulation patterns of the sequence.

20. An audio system according to claim 18, wherein each cycle of audio data comprises data derived from one or more said modulation patterns in the sequence.

21. An audio system according to claim 20, wherein the data derived from one said modulation pattern in the sequence is played back at least once in each cycle of audio data.

22. An audio system according to claim 18:

wherein the radar controller is arranged to modify a given modulation pattern in dependence on the carrier frequency of the signal being modulated, wherein each modulation pattern of the sequence comprises a linear ramp period and a descent period, and the radar controller is arranged to modify the duration of descent periods of respective modulation patterns in the sequence, thereby modifying the modulation pattern, and wherein at least some data derived from one said modulation pattern in the sequence is played back more than once in each cycle of audio data.

23. An audio system according to claim 18, wherein the audio system is arranged to control transitions between consecutive cycles of audio data.

24. An audio system according to claim 23, wherein the audio system is arranged to apply an audio fading function to tone data played back at respective ends of a given cycle of audio data.

25. An audio system according to claim 23, wherein the audio system is arranged to select tone data from a previous cycle of audio data for use in playback prior to receipt of a next cycle of audio data.

26. An audio system according to claim 25, wherein the tone data is selected from an end of the previous cycle of audio data.

27. An audio system according to claim 18, wherein the constant rate is selected so as to be greater than a rate corresponding to said duration of individual modulation patterns of the sequence.

28. A frequency scanning radar system comprising:
a frequency scanning radar controller for use in controlling a frequency generator, the frequency generator being arranged to generate a plurality of sets of signals, each set of signals having a different carrier frequency and comprising a sequence of modulation patterns, transmitted at a selected rate, wherein the radar controller is arranged to select the rate in dependence on the carrier frequency; and
a signal processor arranged to derive tone data from signals received by the frequency scanning radar system,
wherein the signal processor is arranged to process the received signals at a rate dependent on the rate of transmission of the sequence of modulation patterns, and
wherein the signal processor is arranged to cooperate with an audio system, the audio system being arranged to output audio data derived from signals received by the frequency scanning radar system by playback of the derived tone data at a constant rate.

29. A frequency scanning radar system according to claim 28, wherein the radar controller is arranged to modify a given modulation pattern in dependence on the carrier frequency of the signal being modulated.

30. A frequency scanning radar system according to claim 29, wherein the radar controller is arranged to modify the duration of individual modulation patterns of the sequence, thereby modifying the modulation pattern.

31. A frequency scanning radar system according to claim 29, wherein each modulation pattern of the sequence comprises a ramp period and an intervening period, and the radar controller is arranged to modify the duration of the intervening periods of respective modulation patterns in the sequence, thereby modifying the modulation pattern.

32. A frequency scanning radar system according to claim 31, wherein each modulation pattern of the sequence comprises a linear ramp period and a dwell period, and the radar controller is arranged to modify the duration of dwell periods of respective modulation patterns in the sequence, thereby modifying the modulation pattern.

33. A frequency scanning radar system according to claim 31, wherein each modulation pattern of the sequence comprises a linear ramp period and a descent period, and the radar controller is arranged to modify the duration of descent periods of respective modulation patterns in the sequence, thereby modifying the modulation pattern.

34. A frequency scanning radar system according to claim 29, wherein each modulation pattern of the sequence comprises a linear ramp period.

\* \* \* \* \*